(12) United States Patent
Böhringer (10) Patent No.: US 10,155,357 B2
(45) Date of Patent: Dec. 18, 2018

(54) TEXTILE MATERIAL HAVING INCREASED MECHANICAL STRENGTH, IN PARTICULAR HAVING INCREASED RESISTANCE TO PIERCING OR SHOOTING

(75) Inventor: Bertram Böhringer, Wuppertal (DE)

(73) Assignee: Blücher GmbH, Erkrath (DE)

( * ) Notice: Subject to any disclaimer, the term of this patent is extended or adjusted under 35 U.S.C. 154(b) by 466 days.

(21) Appl. No.: 13/202,907

(22) PCT Filed: Jan. 4, 2010

(86) PCT No.: PCT/EP2010/000004
§ 371 (c)(1),
(2), (4) Date: Nov. 7, 2011

(87) PCT Pub. No.: WO2010/094368
PCT Pub. Date: Aug. 26, 2010

(65) Prior Publication Data
US 2012/0128947 A1    May 24, 2012

(30) Foreign Application Priority Data
Feb. 23, 2009   (DE) .................. 10 2009 009 988

(51) Int. Cl.
*B32B 5/00*     (2006.01)
*F41H 1/02*     (2006.01)
(Continued)

(52) U.S. Cl.
CPC .............. *B32B 5/00* (2013.01); *A62B 17/006* (2013.01); *F41H 1/02* (2013.01); *F41H 5/0492* (2013.01);
(Continued)

(58) Field of Classification Search
CPC ............ Y10T 442/20; Y10T 442/2008; Y10T 442/2426; Y10T 442/2508; Y10T 442/2516; Y10T 442/2615; Y10T 442/2623; Y10T 442/2893; Y10T 442/30; Y10T 442/3065; Y10T 428/24; Y10T 428/24826; Y10T 428/24802;
(Continued)

(56) References Cited

U.S. PATENT DOCUMENTS 8,268,736 B2 *   9/2012   Varga-Molnar et al. ...... 442/121
2003/0190850 A1 * 10/2003   Breukers ............ A41D 31/0061
442/48
(Continued)

FOREIGN PATENT DOCUMENTS

DE         20318173           11/2004
DE     102005038098 A1 *       2/2007
(Continued)

*Primary Examiner* — Jeremy R Pierce
(74) *Attorney, Agent, or Firm* — Edward E. Sowers; Brannon Sowers & Cracraft PC (57) ABSTRACT

The present invention relates to a textile web material having improved mechanical strength, in particular having resistance to piercing and/or shooting, having a protective function against chemical and/or biological toxins, in particular weapon agents. The textile web material according to the invention comprises a multilayer construction, wherein the layer construction comprises at least one layer resistant to piercing and/or shooting, and at least one adsorption layer based on discrete adsorption particles.

18 Claims, 1 Drawing Sheet

(51) Int. Cl.
*F41H 5/04* (2006.01)
*A62B 17/00* (2006.01)

(52) U.S. Cl.
CPC ............... *Y10T 428/24826* (2015.01); *Y10T 428/24893* (2015.01); *Y10T 428/24942* (2015.01); *Y10T 442/2008* (2015.04); *Y10T 442/3065* (2015.04)

(58) Field of Classification Search
CPC ..... Y10T 428/24058; Y10T 428/24124; Y10T 428/24372; Y10T 428/24893; Y10T 428/24942; Y10T 428/25; Y10T 428/27; Y10T 428/273; Y10T 428/29; Y10T 428/2982; B32B 5/00; B32B 5/02; B32B 5/026; B32B 5/14; B32B 5/145; B32B 5/16; B32B 5/22; B32B 5/24; B32B 5/26; B32B 5/30; B32B 7/04; B32B 7/12; B32B 9/007; B32B 2250/00; B32B 2250/02; B32B 2250/03; B32B 2250/04; B32B 2250/05; B32B 2255/02; B32B 2255/04; B32B 2262/0269; B32B 2264/108; B32B 2305/10; B32B 2305/18; B32B 2305/188; B32B 2307/536; B32B 2307/5825; B32B 2307/581; B32B 2437/00; B32B 2437/02; B32B 2437/04; B32B 2571/00; B32B 2571/02
USPC ... 442/134–135, 59, 60, 111, 122, 169, 181; 428/198, 221, 340, 341, 402, 911
See application file for complete search history.

(56) References Cited

U.S. PATENT DOCUMENTS

| | | | |
|---|---|---|---|
| 2005/0003727 A1* | 1/2005 | Chiou | 442/239 |
| 2006/0147698 A1* | 7/2006 | Carroll et al. | 428/316.6 |
| 2006/0289088 A1* | 12/2006 | Bruce et al. | 148/237 |
| 2007/0105471 A1* | 5/2007 | Wang | A43B 7/32 442/301 |
| 2007/0134486 A1* | 6/2007 | Bansal et al. | 428/304.4 |
| 2007/0275619 A1* | 11/2007 | von Blucher et al. | 442/80 |

FOREIGN PATENT DOCUMENTS

| | | | |
|---|---|---|---|
| EP | 1818169 | 8/2007 | |
| WO | WO-2004020089 | 3/2004 | |
| WO | WO 2008135114 A2 * | 11/2008 | .......... B01D 39/163 |

* cited by examiner

TEXTILE MATERIAL HAVING INCREASED MECHANICAL STRENGTH, IN PARTICULAR HAVING INCREASED RESISTANCE TO PIERCING OR SHOOTING

CROSS-REFERENCES TO RELATED APPLICATIONS

This application is a National Stage filing of International Application PCT/EP 2010/000004, filed Jan. 4, 2010, entitled TEXTILE MATERIAL HAVING INCREASED MECHANICAL STRENGTH, IN PARTICULAR HAVING INCREASED RESISTANCE TO PIERCING OR SHOOTING claiming priority to German Application DE 10 2009 009 988.3, filed Feb. 23, 2009. The subject application claims priority to PCT/EP 2010/000004, and to German Application No, DE 10 2009 009 988.3, and incorporates all by reference herein, in their entirety.

BACKGROUND OF THE INVENTION

The present invention relates to a textile sheet material having improved mechanical stability, more particularly having stab and/or ballistic resistance, and offering protective performance against chemical and/or biological poisons, and also to protective materials, such as protective suits, protective gloves, protective shoes and protective coverings, produced using the textile sheet material of the invention and/or including the textile sheet material of the invention. The present invention further relates to using the textile sheet material of the invention for production of protective materials of any kind, more particularly as hereinabove recited.

Persons active in the field of threat prevention, such as security personnel, police officers, border guards and also soldiers in military units, when deployed in the event of demonstrations, civil, unrest or military confrontations for example, axe often confronted with direct physical violence due to the use of firearms and/or stabbing weapons for example. Against the background that the use of firearms and/or stabbing weapons will often result in serious injuries to persons affected by the violence, there is an immense need in the prior art to protect such persons from dangers associated with the use of firearms and/or stabbing weapons. A high shrapnel-protective effect of the corresponding protective apparel is also very important, more particularly for soldiers on the battlefield and/or in battlefield action.

In general, protective apparel pieces having ballistic- and/or stab-resistant properties are designed so as to prevent any penetration of a body of a wearer of the protective apparel as a consequence of an attack with a weapon and/or with a sharp/pointed object. In effect, it is necessary for the protective apparel piece in question to be equipped with appropriate devices and/or technical measures that lead no appropriate protective performance, while the prior art often utilizes additional laminate materials to prevent penetration of the apparel piece and hence of the body of a wearer of the protective apparel by being fired at or by the action of a knife thrust.

In this connection, it is often disadvantageous in the prior art that the known protective apparel pieces, which can take the form of a vest or the like for example, occasionally utilize protective materials of very high basis weight and very low flexibility, and this significantly reduces the wearing comfort of the protective apparel piece and constitutes an additional inconvenience for the wearer. However, this is immensely disadvantageous in the context of a deployment, for example a military deployment, since the wearer can thereby be limited in his or her performance and mobility.

More particularly, the prior art has hitherto failed to adequately provide apparel pieces that combine in one material the properties of high protective performance against ballistics and high protective performance against stabbing. This is because the prior art protective apparel pieces are optimized in respect of their bulletproof performance, which is primarily designed to prevent the penetration of ballistic projectiles emanating from firearms. Protective apparel pieces of this type, however, do not always also ensure high protective performance against the penetration or pointed objects, for example knives, blades, chisels or the like. In addition, the prior art protective apparel with stab-resistant properties often is incapable of withstanding large force impacts due to ballistic projectiles, and thus particularly is not capable of offering any protective function with regard so ballistic impacts.

It is further disadvantageous in the prior art that the known protective apparel pieces having elevated stab and/or ballistic resistance have no protective function whatsoever with regard to chemical and/or biological poison and/or warfare agent materials, so that deployments where there is a risk, of exposure to toxic substances, for example the vesicatory Hd (interchangeably known as Yellow Cross or mustard gas) and the nerve agent sarin, either have to proceed without any protective function with regard to these poison materials, or alternatively require an additional protective apparel with optimization in this regard to be worn, which is similarly disadvantageous.

BRIEF SUMMARY OF THE INVENTION

It is against this background that the problem addressed by the present invention is that of providing a textile (sheet) material, which is suitable for producing protective apparel in particular and which at least substantially avoids or alternatively at least ameliorates the above-described disadvantages of the prior art. More particularly, such a textile material should be suitable for production of protective apparel offering protective performance with regard to stabbing and/or ballistics.

A further problem addressed by the present invention is that of providing a textile (sheet) material which combines high wearing comfort with improved mechanical stability and more particularly an elevated stab and/or ballistic resistance.

A further problem addressed by the present invention is finally that of providing a textile (sheet) material having elevated mechanical stability as well as offering a protective function with regard to chemical and/or biological poisons and/or noxiants, more particularly chemical and/or biological warfare agent materials, which textile material shall similarly ensure a high wearing comfort in the course of its use as protective apparel.

The above-stated problems are solved in the context of the present invention by a textile sheet material according to the present disclosure. Further, advantageous embodiments of the textile sheet material, of the present invention are similarly disclosed.

The present invention further provides the protective materials according to the present invention, which can be present for example in the form of protective suits, protective gloves, protective shoes, protective coverings and the like and which are produced using the textile sheet material of the invention and/or which include the textile sheet material of the invention.

The present invention finally further provides for the use of the textile sheet material for production of protective materials of any kind.

The applicant company, then, has surprisingly determined that the problem described above can be solved by providing a textile sheet material according to the invention, which has a multilayered construction with at least one stab- and/or ballistic-resistant layer and at least one adsorption layer based on discrete particles of adsorbent. The applicant company was very surprisingly able to show that such a textile sheet material according to the invention has improved protective properties with regard to stabbing and/or ballistics, while she textile sheet material according to the invention similarly has excellent NBC protection and thus offers a protective function with regard to chemical and/or biological poisons. The textile sheet material is also notable in that protective materials and/or protective apparels produced by using the textile sheet material have an excellent wearing comfort, since the textile sheet material of the present invention has a high breathability and/or air permeability and also a high flexibility coupled with low basis weight. In addition, a material, having excellent shrapnel-protective properties results in the context of the present invention.

It will be readily understood that embodifications, embodiments, advantages and the like that are recited hereinbelow in respect of one invention aspect only, to avoid repetition, self-evidently also apply mutatis mutandis in relation to the other invention aspects.

DETAILED DESCRIPTION OF THE INVENTION

The present invention thus provides—in accordance with a first aspect of the present invention—a textile sheet material having improved mechanical stability, more particularly having stab and/or ballistic resistance (i.e., offering protective performance against stabbing and/or ballistics), and offering protective performance against chemical and/or biological poisons, more particularly warfare agent materials, wherein the textile sheet material according to the invention has a multilayered construction, wherein the multilayered construction includes at least one stab- and/or ballistic-resistant layer and
at least one adsorption layer based on discrete particles of adsorbent.

The fundamental concept of the present invention is accordingly that of providing a textile sheet material of multilayered construction, wherein the multilayered construction, in addition to at least one stab- and/or ballistic-resistant layer, is additionally endowed, in the specific manner of the present invention, with at least one adsorption layer based on discrete particles of adsorbent. This is because the applicant company has surprisingly determined that the specific combination of stab- and/or ballistic-resistant layers on the one hand with a specific adsorption layer based on discrete particles of adsorbent provides a significant improvement in protective performance against stabbing and/or ballistics. In this context, the present invention provides a textile sheet material which on the one hand combines a high ballistic resistance on the one hand, i.e., protective performance against any impact/penetration of ballistic projectiles from firearms in particular, and on the other protective performance against stabbing, i.e., protective performance against the penetration of pointed objects, as of a knife or the like.

Without wishing to be tied to this theory, the presence of the additional adsorption layer based on discrete particles of adsorbent leads to an amplification of the stability of the stab- and/or ballistic-resistant layer, resulting more particularly also from the inherent hardness of the adsorbents and from the targeted interaction of the adsorption layer with the stab- and/or ballistic-resistant layer, for example when the adsorption layer is associated with and/or fixed to the stab- and/or ballistic-resistant layer. In a completely surprising manner, the stab- and/or ballistic-resistant layer and the adsorption layer reinforce one another synergistically, i.e., beyond the sum total of the individual effects, with regard to protective performance against stabbing and/or ballistics.

It is also completely surprising in the context of the present invention that the specific combination of at least one stab- and/or ballistic-resistant layer on the one hand and at least one specific adsorption layer based on discrete particles of adsorbent on the other enhances not only the stab resistance but also the protective performance against ballistics, so that the textile sheet material of the present invention combines the two aforementioned functions/performances in one material. The textile sheet material according to the invention can therefore be used universally so to speak for many danger areas, particularly since the textile sheet material according to the invention—as will be shown hereinbelow—additionally offers protective performance against chemical and/or biological poisons coupled with good shrapnel protection.

This is because, in the context of the present invention, it is similarly ensured that the textile sheet material according to the invention—owing to the presence of adsorbents—additionally includes a protective function with regard to chemical and/or biological poisons, so that the textile sheet material according to the invention is also suitable for military deployment, in particular, especially since the protective apparel produced using the textile sheet material of the present invention has a remarkably high wearing comfort, since the textile sheet material according to the invention has a high breathability and/or air permeability and similarly a high flexibility coupled with low basis weight.

The presence of an adsorption layer further has the advantage that the adsorption layer when exposed to moisture (for example in the processing of the textile sheet material of the present invention into protective apparel and use thereof under moist conditions for ex ample, more particularly in rain etc., or else moisture due to per under physical exertion on wearing the protective apparel under deployment conditions) is capable of reversibly imbibing and intermediately storing or buffering the moisture in large amounts (in order then to gradually release it again continuously and in small amounts) and thereby efficiently prevents the moisture coming into contact with the stab- and/or ballistic-resistant layer and reducing the protective effect thereof (Typically, the effect of moisture in an appreciable reduction in the stab and/or ballistic resistance of stab- and/or ballistic-resistant materials); in this way, the stab and/or ballistic resistance offered by the textile sheet material according to the present invention can be efficiently upheld by the presence of the adsorption layer.

The term "stab resistance" or "stab resistant", as it is to be understood in the context of the present invention, relates more particularly to a protective function/performance against the penetration of a pointed object, for example a knife, blade, chisel or the like, into and/or through the textile sheet material of the present invention. The textile sheet material according to the invention thus offers high stab resistance and/or high protection to a stab penetration by the aforementioned pointed objects.

Furthermore, the term "ballistic resistance" or "ballistic resistant" in the context of the present invention is to be understood as meaning a protective function with regard to the penetration of bullets and/or ballistic projectiles emanating particularly from firearms or the like and impacting at high speeds on the textile sheet material of the present invention. In other words, so-called bulletproof properties are concerned here.

As far as the construction and/or arrangement of the layers or plies in the textile sheet material of the present invention is concerned, one possible embodiment of the present invention provides that the adsorbent particles of the adsorption layer—or the adsorption layer as such—are secured to the stab- and/or ballistic-resistant layer. In this case, the stab- and/or ballistic-resistant layer can serve as carrier for the adsorbent particles of the adsorption layer. In other words, in this embodiment of the present invention, the adsorbent particles of the adsorption layer are bonded to the stab- and/or ballistic-resistant layer, or the stab- and/or ballistic-resistant layer has the adsorbent particles of the adsorption layer applied to it, for example by adhering, more particularly as hereinbelow recited. This makes it possible for a direct stabilization of the stab- and/or ballistic-resistant layer by the adsorbent particles to be realized, which leads to extremely good results in respect of stab and ballistic resistance owing to the above-described stabilization of the stab- and/or ballistic-resistant layer.

In accordance with an alternative embodiment, it can also be provided in the context of the present invention that the textile sheet material according to the invention includes a carrier layer which is preferably arranged between the stab- and/or ballistic-resistant layer and the adsorption layer, in which case the adsorbent particles of the adsorption layer are secured to the carrier layer. In this context, therefore, the carrier layer can serve as carrier for the adsorbent particles of the adsorption layer. In this case too, the presence of the discrete particles of adsorbent results in very good stab protection and ballistic resistance properties.

In accordance with this embodiment, it can accordingly be provided that the carrier layer is secured to the stab- and/or ballistic-resistant layer, and/or that the adsorbent particles of the adsorption layer are secured to the carrier layer on that side of the carrier layer which faces away from the stab- and/or ballistic-resistant layer. In other words, it can be provided according to the present invention that the additional carrier layer is as it were arranged between the stab- and/or ballistic-resistant layer on the one hand and the adsorption layer, in which case the carrier layer can be bonded, more particularly adhered (for example punctiformly adhered), to the ballistic-resistant layer and/or to the adsorption layer. In this case, therefore, the result is a layer sequence of a) stab- and/or ballistic-resistant layer, b) carrier layer and c) adsorption layer.

However, it is also similarly possible to realize a layered construction in the context of the present invention whereby the adsorption layer is associated with the stab- and/or ballistic-resistant layer and is provided with the carrier layer on that side of the adsorption layer which faces away from the stab- and/or ballistic-resistant layer. This embodiment results in a layer sequence of a) stab- and/or ballistic-resistant layer, b) adsorption layer and c) additional carrier layer.

It is accordingly possible according to the present invention for the adsorbent particles of the adsorption layer to be arranged between the carrier layer and the stab- and/or ballistic-resistant layer, more particularly for the adsorbent particles to be secured to the carrier layer on that side of the carrier layer which faces toward the and/or ballistic-resistant layer, and/or more particularly for the adsorbent particles of the adsorption layer to be additionally secured to that side of the stab- and/or ballistic-resistant layer which faces toward the carrier layer.

The carrier layer serves more particularly to further stabilize the bonded layered assembly and particularly the adsorption layer, while in addition the flexibility of the overall bonded assembly can be further enhanced.

The adsorbent particles of the adsorption layer in the context of the present invention can preferably be fixed to the stab- and/or ballistic-resistant layer and/or to the carrier layer via a discontinuously, more particularly punctiformly, applied adhesive. In this regard, any adhesive familiar per se to a person skilled in the art can be used, for example a thermoplastic adhesive and/or reactive adhesive, for example based on polyurethane.

The term "punctiform(ly)" is to be understood in the context of the present invention as relating no a non coherent application of the adhesive, for example as part of a punctiform grid. This is because, in a completely surprising manner, even a merely punctiform fixing of the adsorbent leads to an additional stabilization of the stab- and/or ballistic-resistant layer. In addition, the discontinuous adhering leads to an improved wearing comfort for the protective materials produced from the textile sheet material according to the invention, particularly since the breathability/air exchange as well as the flexibility of the material are in an improved state. However, in the context of the present invention, it is also possible—although this is not preferred—for a continuous application of adhesive to be realized to fix the adsorbents.

It is advantageous in the context of the present invention when the adsorbent particles of the adsorption layer (4) are at least 50%, more particularly at least 60% and preferably at least 70% freely accessible to the chemical and/or biological poisons to be adsorbed. This is accomplished by the amount and type, more particularly the viscosity, of the adhesive having been designed such that the adsorbent particles of the adsorption layer do not sink and/or are not pressed fully into the adhesive.

The adhesive should be applied in an amount of 1 to 200 g/m$^2$, more particularly 5 to 150 g/m$^2$, preferably 10 to 120 g/m$^2$, more preferably 20 to 100 g/m$^2$, even more preferably 25 to 80 g/m$^2$ and most preferably 30 to 75 g/m$^2$.

As far as coverage with the adsorbents is concerned, particularly good results are obtainable according to the present invention when at least 50%, more particularly at least 60%, preferably at least 70%, more preferably at least 75% and even more preferably at least 80% of the side of the stab- and/or ballistic-resistant layer and/or carrier layer to which the adsorbent particles of the adsorption layer have been applied has had adsorbent particles applied to it. This is because this provides particularly good stabilization of the stab- and/or ballistic-resistant layer while at the same time ensuring that the textile sheet material according to the invention as such is flexible and also possessed of good permeability to air. In the context of the present application, the application of adhesive should be adapted to the above-mentioned degrees of coverage.

As far as the adsorbent particles as such are concerned, it can be provided in accordance with a particularly preferred embodiment of the present invention that the adsorption layer comprises adsorbent particles adsorbing chemical and/or biological poisons. The adsorbent particles of the adsorption layer can be based on activated carbon, more particularly in the form of activated carbon particles and/or activated carbon fibers.

It is particularly advantageous in this context when the adsorbent particles of the adsorption layer are in the form of, or comprise, discrete particles of activated carbon in granule form ("granulocarbon") or spherical form ("spherocarbon").

It can further be provided in the context of the present invention that the adsorbent particles of the adsorption layer have a median diameter of <1.0 mm, more particularly <0.5 mm, preferably <0.4 mm, more preferably <0.35 mm and even more preferably <0.3 mm, and/or that the median diameter of the adsorbent particles is at least 0.1 mm. The recitations relating to the median diameter concern the so-called $D_{50}$ value, which can be determined, for example, and in a nonlimiting manner, by laser diffraction or sieve analysis, as is well, known to a person skilled in the art.

The adsorbent particles of the adsorption layer can be applied to the stab- and/or ballistic-resistant layer (3, 3') and/or the carrier layer (5) in an amount of 5 to 500 g/m$^2$, more particularly 10 to 450 g/m$^2$, preferably 20 to 400 g/m$^2$, more preferably 25 to 350 q/m$^2$, even more preferably 50 to 325 g/m$^2$ and most preferably 50 to 300 q/m$^2$.

Furthermore, the adsorbent particles of the adsorption layer can have an internal surface area (BET) of at least 800 m$^2$/g, more particularly of at least 900 m$^2$/g, preferably of at least 1000 m$^2$/g and more preferably in the range from 800 to 1500 m$^2$/g.

The adsorbent particles of the adsorption layer should further have a bursting pressure per individual adsorbent particle of at least 5 newtons, more particularly at least 10 newtons and/or preferably at least 15 newtons, or up to 20 newtons. A high bursting pressure on the part of the adsorbent particles is of immense importance against the background of stabilizing the textile sheet material and/or the stab- and/or ballistic-resistant layer. The high bursting pressures provided according to the present invention lead to a significant improvement in protective function/performance with regard to stabbing and/or ballistics.

Especially against the background of improving the protective function/performance with regard to chemical and/or biological poisons/warfare agent materials, it can be provided that the adsorbent particles of the adsorption layer additionally are impregnated with at least one catalyst. The presence of a catalyst has the effect that adsorbed toxic substances are at least partially catalytically degraded and thus rendered harmless. In this way, any exhaustion of the adsorption layer is also actively counteracted, which is of importance in the event of high contamination with toxic substances in particular. As catalyst there can be used in this connection enzymes and/or metal ions, preferably copper, silver, cadmium, platinum, palladium, zinc and/or mercury ions. In addition, the amount of catalyst can be 0.05% to 12% by weight, preferably 1% to 10% by weight and more preferably 2% to 8% by weight, based on the weight of the adsorbent particles.

The stab- and/or ballistic-resistant layer of the textile sheet material of the present invention can be a textile fabric, preferably a woven fabric. In addition, the stab- and/or ballistic-resistant layer can also be in the form of a loop-formingly knitted fabric, loop-drawingly knitted fabric, laid fabric or the like. However, it is preferable according to the present invention for the stab- and/or ballistic-resistant layer no be formed as a woven fabric, since a woven fabric as such has excellent stability properties particularly with, regard to ensuring stab protection and also a protective function against ballistics.

The stab- and/or ballistic-resistant layer or to be more precise the woven fabric for the stab- and/or ballistic-resistant layer (s) should further have a high cover factor. In this context, the stab- and/or ballistic-resistant layer of the woven fabric should have a cover factor in the range from 0.6 to 0.99, more particularly in the range from 0.65 to 0.98 and preferably in the range from 0.7 to 0.95. The cover factor is a computed value which relates to the geometry of the binding in the stab- and/or ballistic-resistant layer or to be more precise in the woven fabric, and indicates the percentage of the overall surface area of the layer or woven fabric that is covered by yarns or fibers. For further details, reference can be made to the technical literature in this regard, more particularly to "Weaving: Conversion of yarns to fabric", Lord and Mohammed, published by Merrow, 1982, pages 141 to 143.

Particularly good results in respect of ensuring a protective function/performance with regard to stabbing and/or ballistics can be achieved when the stab- and/or ballistic-resistant layer contains or consists of fibers and/or yarns based on aramids (e.g., Kevlar® from DuPont or Twaron® from Twaron-Products or to be more precise Teijin); polybenzazoles, more particularly poly(phenylene-2,6-benzobisoxazole) (=PBO)) (e.g., Zylon® from Toyobo); high-performance polyethylene (=HPPE, interchangeably also known as ultra high molecular weight polyethylene or UHMWPE or UHMW or high modulus polyethylene or HMPE) (e.g., Spectra® from Allied Signal or to be more precise Honeywell Performance Fibres or Dyneema® from DSM or Royal DSM N.V.); high performance polyesters (high tenacity polyesters); preferably based on aramids. In this context, the aramid can be more particularly selected from the group of para-aramids and their copolymers and mixtures. Such substances/fibers or yarns of the aforementioned type are well known as such to a person skilled in the art and are commercially available. Especially the use of poly(p-phenyiterephthalamide) or poly(m-phenyleneterephthalamide) comes into consideration.

The group of materials known as aramids, which are interchangeably also referred to as aromatic polyamides and polyaramids, generally includes long-chain synthetic polyamides wherein at least 85% of the aramid groups are directly attached to aromatic rings.

Aramid fibers are notable for very high tenacity, high impact strength, high breaking extension, good vibration damping and also for high resistance to acids and alkalis. In addition, aramid fibers and/or yarns are extremely heat and fire resistant. The use of para-aramids or to be more precise para-aramid fibers is preferred according to the present invention, but similarly the use of meta-aramids or to be more precise meta-aramid fibers also comes into consideration. Useful para-aramids include for example fibers and/or yarns of the Kevlar® type and also of the Twaron® type and useful meta-aramids include fibers and/or yarns of the type Nomex® and also Tejinoconex®. Fibers of this kind are well known to a person skilled in the art and a person skilled in the art is at all times able to select the fibers and/or yarns for the stab- and/or ballistic-resistant layer that are suitable in the context of the present invention.

For further observations concerning aramids, reference can be made to Römpp Chemielexikon, 10$^{th}$ edition, volume 1, 1996, Georg Thieme Verlag Stuttgart/New York, head word "Aramide", page 245, and also the references cited therein, which are hereby fully incorporated herein by reference.

It can further be advantageous for the aforementioned yarns and/or fibers having stab and/or ballistic resistance properties (e.g., para-aramids) and those having heat and/or fire resistance (e.g., meta-aramids) to be combined with each or one another. This results in a layer and hence in a textile sheet material as a whole which has both stab and/or ballistic resistance properties and heat and/or fire resistance properties (flame resistance properties). Therefore, in accordance with a special embodiment of the present invention, the sheet material of the present invention can additionally also contain heat- and/or fire-resistant (flame-resistant) fibers and/or yarns; these can be a constituent part of the stab- and/or ballistic-resistant layer or to be more precise incorporated therein, and/or form a separate layer.

With regard to suitable fibers and/or yarns in the con text of the present invention for forming the stab- and/or ballistic-resistant layer or ply, it is advantageous when the fibers and/or yarns have a fiber linear density of 50 to 5000 denier, more particularly 60 to 4000 denier and preferably 70 to 3000 denier. The fibers and/or yarns should have a tenacity of at least 10 g/denier (gpd), more particularly at least 20 g/denier and preferably at least 30 g/denier. In addition, the fibers and/or yarns should have a breaking extension of at least 1.5%, more particularly at least 1.8%, preferably at least 2.0%, more preferably at least 2.2% and even more preferably at least 2.4%.

For example, the fibers and/or yarns or to be more precise woven fabrics used for the stab- and/or ballistic-resistant layer(s) can be as described in WO 93/11290 A1 or WO 2005/049903 A2, the respective disclosure contents of which are hereby fully incorporated herein by reference.

The stab- and/or ballistic-resistant layer(s) can altogether have a basis weight of 0.2 kg/m$^2$ to 10 kg/m$^2$, more particularly 0.5 kg/m$^2$ to 8 kg/m$^2$, preferably 0.75 kg/m$^2$ to 6 kg/m$^2$ and more preferably 1 kg/m$^2$ to 4 kg/m$^2$.

The stab- and/or ballistic-resistant layer (a) can each be formed as a woven fabric having 1 million to 20 million fiber crossing points/cm$^2$, more particularly 2 million to 17 million fiber crossing points/cm$^2$ and prefer, ably 3 to 15 million fiber crossing points/cm$^2$. The specific construction of the woven fabric with a high number of fiber crossing points can—without wishing to be tied to this theory—further enhance the stability of the stab- and/or ballistic-resistant layer, since the fibers and/or yarns intermesh so to speak and thus further stabilize the woven fabric.

It may be provided in the context of the present invention that the textile sheet material includes a multiplicity of, more particularly at least two, stab- and/or ballistic-resistant layers, in which case more particularly the individual layers are associated with each or one another, more particularly are bonded together, in which case more particularly the individual layers form a bonded assembly. The stab- and ballistic-resistant layers can be for example adhered together, preferably via a particularly punctiformly applied adhesive. Stitching, stapling or clipping the respective layers together, or a combination of the aforementioned measures, is similarly possible. Another possibility is a loose assembly with only edge-sided securing of the stab- and/or ballistic-resistant layers for example.

It may be provided in this context that the respective stab- and/or ballistic-resistant layers can be identical to or different from each or one another. For instance and nonlimitingly, the respective stab- and/or ballistic-resistant layers can have different basis weights and/or each include mutually different fibers and/or yarns. It may be provided for example in this connection that, when a plurality and stab- and/or ballistic-resistant layers are present, some of the layers are optimized for improved stab resistance properties while the other stab- and/or ballistic-resistant layers are optimized for improved protection properties against ballistic penetration.

As far as the arrangement of the layers in the textile sheet material of the present invention is concerned, the stab- and/or ballistic-resistant layer should be arranged on the outside in the use state of the textile sheet material. The adsorption layer should be arranged on the inside in the use state of the textile sheet material. The term "outside" is to be understood as meaning that the layer in question in the donned state faces away from the body of a wearer/user of the textile sheet material, while the term "inside" is to be understood as meaning that the corresponding layer or ply in the donned or use state of the textile sheet material according to the invention faces toward the body of the wearer or, respectively, user.

In a further embodiment of the present invention, the textile sheet material may additionally include a first covering layer. The first covering layer can be arranged on that side of the stab- and/or ballistic-resistant layer which faces away from the adsorption layer. The first covering layer can be arranged on the outside in the use state of the textile sheet material.

The first covering layer can be formed as a textile material, preferably an air-permeable textile material and more particular as a textile fabric in this context, the first covering layer can be a woven, loop-formingly knitted, loop-drawingly knitted, laid or bonded textile fabric, preferably a woven fabric. The first covering layer serves more particularly as external covering of the textile sheet material and thus constitutes so to speak a first or external protective layer which for example protects the layers/plies thereunder from soiling. The first covering layer can also be provided with a camouflaging coloration or the like.

The first covering layer can similarly be oleophobicized and/or hydrophobicized, more particularly via a specific impregnation. This can further improve particularly the protective function with regard to chemical and/or biological poisons, since poisons landing on the textile sheet material, according to the invention in the form of large droplets in particular cannot even pass into and/or through the first covering layer, i.e., the passage of poison materials is at least delayed and/or reduced.

The first covering layer can have a basis weight of 50 to 300 g/m$^2$, more particularly 75 to 250 g/m$^2$ and preferably 90 to 175 g/m$^2$. The first covering layer can also be formed as an air-permeable textile fabric which has a basis weight of 75 to 250 g/m$^2$ and preferably 90 to 175 g/m$^2$ and which may have been given an oleophobic and/or hydrophobic finish. In the context of the present invention, it is similarly possible—especially when no first covering layer is provided—for the stab- and/or ballistic-resistant layer arranged on the outside to have an oleophobic and/or hydrophobic finish.

It is additionally possible in the context of the present invention for the textile sheet material according to the invention to additionally include a second covering layer, in which case more particularly the second covering layer is arranged on that side of the adsorption layer which faces away from the stab- and/or ballistic-resistant layer and/or in which case more particularly the second covering layer is arranged on the inside in the use state of the textile sheet material. The second covering layer, in relation to the donned and/or use state of the textile sheet material of the present invention, for example in the form of a protective suit, thus forms the final inner layer so to speak, which is arranged on the inside and faces toward the body of a wearer or user. It may be provided, in accordance with the above observations, that the above-described additional carrier layer is arranged between the adsorption layer and the second covering layer.

The second covering layer can be formed as a textile material, preferably an air-permeable textile material, more particularly a textile fabric. The second covering layer can be a woven, loop-formingly knitted, loop-drawingly knitted, laid or bonded textile fabric, more particularly a fibrous nonwoven web, preferably a polyamide/polyester fibrous nonwoven web. The second covering layer can be abrasion resistant and/or formed of an abrasion-resistant textile material.

The second covering layer can have a basis weight of 5 to 150 $g/m^2$, more particularly 10 to 125 $g/m^2$ and preferably 40 to 100 $g/m^2$.

The presence of the second covering layer or to be more precise inner covering material has more particularly the advantage that in the donned and/or use state direct contact of the skin with the adsorption layer is avoided. This not only ensures that the adsorption layer does not become contaminated with skin perspiration but also provides a higher wearing comfort, since the second covering layer within the layered construction according to the present invention assumes the function of an inner covering layer which engenders a pleasant wearing feel. In addition, the covering layer prevents excessive mechanical stressing of the adsorption material of the adsorption layer.

The first and second covering layers may be associated with the textile sheet material as a loose assembly. Similarly, securement of the respective layers is also possible, for example via a preferably punctiformly adhered adhesive or an adhesive web, or alternatively via stitching, stapling, adhering or the like, or combinations of the aforementioned measures.

It may also be provided according to the present invention that the textile sheet material additionally includes a membrane which is at least essentially water and air impermeable but water vapor permeable and delays the passage of chemical and/or biological poisons or is at least essentially impermeable to chemical and/or biological poisons, more particularly wherein the membrane is arranged between the stab- and/or ballistic-resistant layer and the adsorption layer. The membrane constitutes as it were an additional barrier layer to chemical and/or biological poisons and leads to an improvement in the protective function against toxic substances as a whole. The presence of a membrane also has the advantage that the adsorption layer, more particularly the adsorbent particles, is protected from penetrating chemical and/or biological poisons, so chat the adsorption layer as such is as it were never exhausted and the protective function against chemical and/or biological poisons is upheld even under adverse conditions involving severe contaminations with poison material while at the same time providing stab and/or ballistic protection. The presence of a membrane or membrane system further has the advantage that the membrane or membrane system on exposure to moisture (for example, when the textile sheet material of the present invention is made into protective apparel and the latter is used for example under moist conditions, more particularly rain etc.) efficiently prevents the moisture coming into contact with the stab- and/or ballistic-resistant layer and reducing the protective effect thereof (Typically, the effect of moisture is an appreciable reduction in the stab and/or ballistic resistance of stab- and/or ballistic-resistant materials.); in this way, the stab and/or ballistic resistance offered by the textile sheet material according to the present invention can be efficiently upheld.

Such membranes and membrane systems are well known to a person skilled in the art. For example, the membrane can consist of or comprise a plastic or a polymer material, in which case more particularly the plastic or the polymer material is selected from the group of polyurethanes, polyether amides, polyester amides, polytetrafluoroethylenes and/or polymers based on cellulose, and also derivatives of the aforementioned compounds.

The membrane can be a continuous, more particularly uninterrupted or at most microporous membrane. The thickness of the membrane can be 1 to 500 μm, more particularly 1 to 250 μm, preferably 1 to 100 μm, more preferably 1 to 50 μm, even more preferably from 2.5 to 30 μm and most preferably 5 to 25 μm. The membrane can similarly be adhered, punctiformly in particular, to the adsorbents or to be more precise the particles of adsorbent, and/or to the stab- and/or ballistic-resistant layer. In the use or donned state of the textile material according to the invention, more particularly in the form of protective suits, the membrane should be arranged on that side of the adsorption layer which faces away from the body of the wearer/user to ensure the aforementioned protective function.

The textile sheet material of the present invention, as mentioned, has excellent properties with regard to ensuring a protective function against stab and/or ballistic penetration. The textile sheet material according to the invention can have a stab resistance of more than 1.0 newtons, more particularly more than 20 newtons, preferably more than 60 newtons, more preferably more than 1.00 newtons and even more preferably more than 150 newtons, according to the analogously applied DIN EN 388:2003. In addition, the textile sheet material according no the invention can have a cut resistance of more than the factor 1.2, more particularly more than the factor 2.5, preferably more than the factor 5, more preferably more than the factor 10 and even more preferably than the factor 20, according to DIN EN 388: 2003. Furthermore, the textile sheet material according to the invention can have a breaking strength of more than 10 newtons, more particularly more than 25 newtons, preferably more than 50 newtons and more preferably more than 75 newtons, according to DIN EN 388:2003. Finally, the textile sheet material cycles, more particularly more than 500 cycles, preferably more than 1000 cycles, more preferably more than 2000 cycles and even more preferably more than 5000 cycles, according to DIN EN 388:2003.

In addition, the textile sheet material of the present invention affords an excellent protective performance against chemical and/or biological poisons/warfare agent materials. Thus, the textile sheet material of the present invention is generally capable of providing a barrier effect against chemical warfare agent materials, more particularly bis[2-chloroethyl] sulfide (interchangeably also known as mustard gas, Hd or Yellow Cross), determined to method 2.2 of CRDEC-SP-84010, permitting permeation of at most 4

µg/g² per 24 h, more particularly at most 3.5 µg/g² per 24 h, preferably at most 3 µg/g² per 24 h and more preferably at most 2.5 µg/g² per 24 h.

It is further advantageous according to the present invention when the textile sheet material of the invention is gas permeable and more particularly air permeable, which is the case in particular when no membrane is provided. The gas or to be more precise air permeability of the textile filter material of the present invention should be at least 10 $l \cdot m^{-2} \cdot s^{-1}$, more particularly at least 30 $l \cdot m^{-2} \cdot s^{-1}$, preferably at least 50 $l \cdot m^{-2} \cdot s^{-1}$, more preferably at least 100 $l \cdot m^{-2} \cdot s^{-1}$ and most preferably at least 400 $l \cdot m^{-2} \cdot s^{-1}$, and/or be up to 10 000 $l \cdot m^{-2} \cdot s^{-1}$ at a flow resistance of 127 Pa.

Figure 1A:
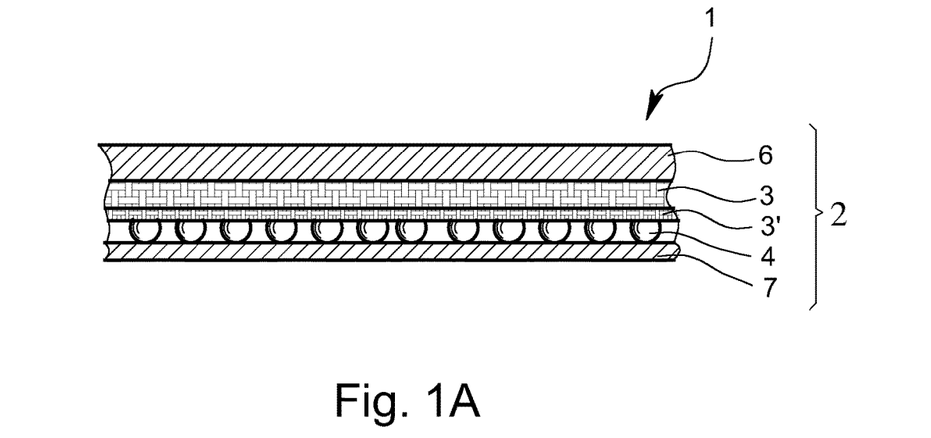
FIG. 1A provides a schematic sectional depiction through the layered construction of an inventive textile sheet material whereby the adsorbent particles of the adsorption layer are directly arranged on a stab- or ballistic-resistant layer.
Figure 1B:
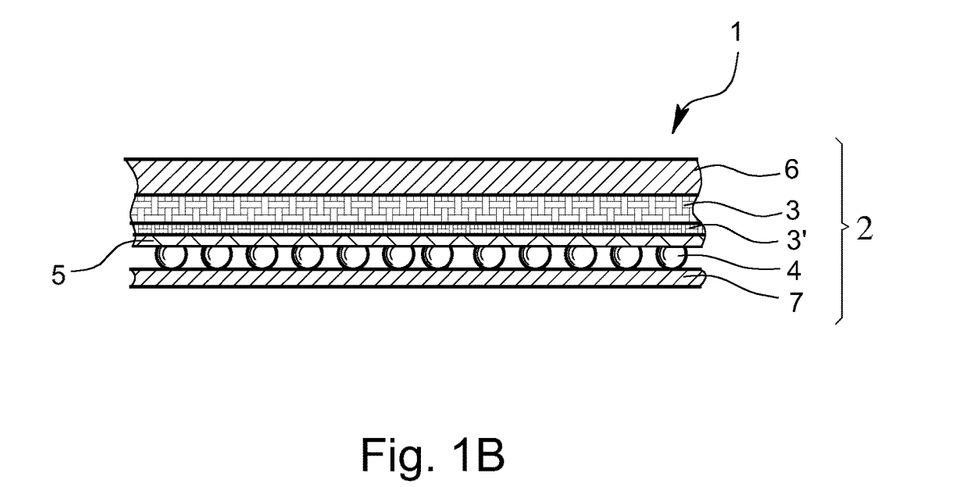
FIG. 1B provides a schematic sectional depiction through the layered construction of an inventive textile sheet material according to a further embodiment of the present invention whereby an additional carrier is fitted between the stab- and/or ballistic-resistant layer and the adsorption layer.

Further advantages, properties, aspects and features of the present invention are apparent from the ensuing description of exemplary embodiments depicted in the figures, of which FIG. 1A shows a schematic sectional depiction through the layered construction of an inventive textile sheet material whereby the adsorbent particles of the adsorption layer are directly arranged on a stab- or ballistic-resistant layer; and FIG. 1B shows a schematic sectional depiction through the layered construction of an inventive textile sheet material according to a further embodiment of the present invention whereby an additional carrier is fitted between the stab- and/or ballistic-resistant layer and the adsorption layer.

FIG. 1A shows a schematic sectional depiction through the layered construction 2 of the inventive textile sheet material 1 corresponding to a specific embodiment of the present invention. The multi-layered layered construction 2 of the inventive textile sheet material 1 includes two stab- and/or ballistic-resistant layers 3, 3' and an adsorption layer 4 based on discrete particles of adsorbent. The adsorbent particles are on the second stab- and/or ballistic-resistant layer 3'. In addition, the textile sheet material 1 according to the invention as per this embodiment includes a first covering layer 6, which is associated with the first stab- and/or ballistic-resistant layer 3, and a second covering layer 7, which is associated with the adsorption layer 4.

Furthermore, FIG. 1B shows a schematic sectional depiction through the layered construction 2 of an inventive textile sheet material 1 corresponding to a further specific embodiment of the present invention. The inventive textile sheet material 1, in supplementation to the layered construction depicted in FIG. 1A, includes an additional carrier 5 which is arranged between the adsorption layer 4 and the second stab- and/or ballistic-resistant layer 3'.

As already described above, there is a special embodiment of the present invention wherein the textile sheet material 1 may additionally be rendered heat resistant and/or fire resistant (flame resistant) and more particularly contain heat-resistant and/or fire-resistant (flame-resistant) fibers and/or yarns (not depicted in the figures); these heat-resistant and/or fire-resistant (flame-resistant) fibers and/or yarns can be a constituent part of the stab- and/or ballistic-resistant layer 3, 3' or be incorporated therein (not depicted in the figures) and/or form a separate layer (likewise not depicted in the figures).

For further details of the inventive adsorption filter material 1 which apply in this regard, the above observations can be referenced.

The present invention further provides—in accordance with a second aspect of the present invention—the protective materials of the present invention, more particularly protective suits, protective gloves, protective shoes and protective coverings, produced using the textile sheet material according to the invention, as defined above, and/or including the textile sheet material 1 according to the invention as defined above.

The protective materials of the present invention and the textile sheet material according to the invention are produced in a conventional manner. This is very well known to a person skilled in the art of producing protective materials, so that no further details are required here in this regard.

The present invention finally provides—in accordance with a third aspect of the present invention—for the use of the textile sheet material according to the invention as defined above for production of protective materials of any kind, more particularly protective suits, protective gloves, protective shoes and protective coverings, preferably for NBC deployment.

Further embodifications, modifications and variations of the present invention are readily discernible and realizable for a person skilled in the art on reading the description without he or she leaving the scope of the present invention.

The present invention is illustrated with reference so the exemplary embodiment which follows and which is not to restrict she present invention in any way.

Exemplary Embodiments

Different textile sheet materials are produced, namely a comparative material without adsorption layer and inventive textile sheet materials having applied to a stab- and ballistic-resistant layer an adsorption layer based on discrete particles of adsorbent.

The inventive textile sheet materials are produced using a stab- and/or ballistic-resistant layer based on a woven fabric of aramid fibers and utilizing fibers or to be more precise yarns based on poly(p-phenyleneterephthalamide) obtainable from E.I. Dupont de Nemours and Company and marketed under the product name of Kevlar®. The resulting woven fabric has a cover factor of 0.72 and a basis weight of about 1 kg/m². This stab- and/or ballistic-resistant layer has a dotted grid of adhesive applied to it in an amount of about 40 g/m² to 75% coverage for fixing the adsorbents. As adsorbent particles there is applied granular or spherical activated carbon having a median particle diameter ($D_{50}$ value) of about 0.3 mm, in an amount of 100 g/m². The particles of adsorbent have a bursting pressure of about 15 N. The adsorption layer then has a second covering layer and, on that side of the stab- and/or ballistic-resistant fabric which faces away from she adsorption layer, a first covering layer.

Further inventive textile sheet materials are produced each with a different loading of adsorbent in that the above-described granular or spherical activated carbon is in this regard used in a respective amount of 50 g/m², 300 g/m², 400 g/m² and 500 g/m². The amount of adhesive and the degree of coverage with adhesive are appropriately adapted.

The comparative material, was produced correspondingly except, that the second covering layer was applied directly to that side of the stab- and/or ballistic-resistant layer which faces away from the first covering layer. The comparative material does not include any activated carbon.

The inventive examples and the comparative example have their stab resistance determined analogously to DIN EN 388:2003 wherein the stab penetration force is defined as the force needed to push a steel pin of defined dimensions through a test specimen secured to a holding device.

The noninventive, comparative example was in this regard found to have a stab resistance of merely 14 newtons, whereas the inventive example, which utilizes the adsorption layer, was determined to have a stab resistance in this regard of 25 newtons at an activated carbon loading of 50 g/m², of 52 newtons at an activated carbon loading of 100 g/m², or 65 newtons at an activated carbon loading of 300 g/m², of 69 newtons at an activated carbon loading of 400 g/m² and of 70 newtons at an activated carbon loading of 500 g/m². The inventive materials, compared with the non-inventive material, thus have distinctly improved properties. It is also observable that, as the loading with activated carbon increases, the stab resistance or protection further improves, while excellent values are found combined with good flexibility for the material at a loading rate of 300 g/m² and 400 g/m². Stab protection is only minimally better at a loading rate of 500 g/m² and the material is distinctly stiffer and less flexible at this loading rate.

The various sheet materials were also exposed to a saturated water vapor atmosphere at 25° C. for twelve hours. The noninventive, comparative example was subsequently found to give a 34% reduced stab resistance, whereas this reduction in stab resistance was only 8% for the inventive examples with an activated carbon loading of 50 g/m² and only 2% for an activated carbon loading of 100 g/m², while no reduction in stab resistance occurred at all at an activated carbon loading of 300 g/m² and of 400 g/m².

The exemplary embodiments recited above demonstrate the excellent properties of the inventive textile sheet material in respect of protective function with regard to stabbing and/or ballistics.

The invention claimed is:

1. A textile sheet material having stab resistance and ballistic resistance, and offering protective performance against chemical or biological poisons and warfare agents, wherein the textile sheet material has a multilayered construction, wherein the multilayered construction comprises:
   (a) at least one stab-resistant and ballistic-resistant layer, wherein the stab-resistant and ballistic-resistant layer is a textile fabric and has a basis weight of 0.5 kg/m² to 8 kg/m' and wherein the stab-resistant and ballistic-resistant layer comprises or consists of fibers or yarns based on a material selected from the group consisting of aramids and ultra high molecular weight polyethylenes (UHMWPE's), wherein the fibers or yarns have a fiber linear density of 50 to 5,000 denier; and
   (b) at least one adsorption layer based on discrete particles of adsorbent, wherein the adsorbent particles of the adsorption layer are based on activated carbon in the form of activated carbon particles wherein the amount of activated carbon particles is 50 g/m² to 500 g/m²;
   wherein the adsorbent particles of the adsorption layer have a median diameter of at least 0.1 mm and less than 1.0 mm and wherein the adsorbent particles of the adsorption layer have a bursting pressure per individual adsorbent particle of at least 5 Newtons and up to 20 Newtons,
   wherein the textile sheet material has a stab-resistance of more than 10 Newtons according to DIN EN 388:2003, and a breaking strength of more than 10 Newtons according to DIN EN 388:2003, and
   wherein the textile sheet material comprising the at least one adsorption layer exhibits greater stab resistance than the textile sheet material without an adsorption layer.

2. The textile sheet material according to claim 1, wherein the adsorbent particles of the adsorption layer are secured to the stab-resistant and ballistic-resistant layer, wherein the stab-resistant and ballistic-resistant layer serves as support for the adsorbent particles of the adsorption layer.

3. The textile sheet material according to claim 1, wherein the textile sheet material comprises a support layer which is arranged between the stab-resistant and ballistic-resistant layer and the adsorption layer, wherein the adsorbent particles of the adsorption layer are secured to the support layer, wherein the support layer serves as support for the adsorbent particles of the adsorption layer.

4. The textile sheet material according to claim 1, wherein the adsorbent particles of the adsorption layer are fixed to the stab-resistant and ballistic-resistant layer or to the support layer via a discontinuously applied adhesive.

5. The textile sheet material according to claim 4, wherein the adsorbent particles of the adsorption layer are at least 50% freely accessible to the chemical or biological poisons to be adsorbed and wherein the adsorbent particles are at least 50% not covered with adhesive.

6. The textile sheet material according to claim 4, wherein the adhesive is applied in an amount of 1 to 200 g/m².

7. The textile sheet material according to claim 1, wherein at least 50% of the side of the stab-resistant and ballistic-resistant layer or of the support layer to which the adsorbent particles of the adsorption layer have been applied has adsorbent particles applied to it.

8. The textile sheet material according to claim 1, wherein the aramid is selected from the group of para-aramids and their copolymers and mixtures.

9. The textile sheet material according to claim 1, wherein the fibers or yarns have a fiber linear density of 60 to 4,000 denier and wherein the fibers or yarns have a tenacity of at least 10 g/denier (gpd) and wherein the fibers or yarns have a breaking extension of at least 1.5%.

10. The textile sheet material according to claim 1, wherein the stab-resistant and ballistic-resistant layers have altogether a basis weight of 0.75 kg/m² to 6 kg/m² and wherein the stab-resistant and ballistic-resistant layers are in the form of a woven fabric having 1 million to 20 million fiber crossing points/cm².

11. The textile sheet material according to claim 1, wherein the textile sheet material additionally comprises a first covering layer, wherein the first covering layer is arranged on that side of the stab-resistant and ballistic-resistant layer which faces away from the adsorption layer or wherein the first covering layer is arranged on the outside in the use state of the textile sheet material.

12. The textile sheet material according to claim 1, wherein the textile sheet material additionally comprises a second covering layer, wherein the second covering layer is arranged on that side of the adsorption layer which faces away from the stab-resistant and ballistic-resistant layer or wherein the second covering layer is arranged on the inside in the use state of the textile sheet material.

13. The textile sheet material according to claim 1, wherein the textile sheet material additionally comprises a membrane which is at least essentially water impermeable and air-impermeable but water vapor permeable and delays the passage of chemical or biological poisons or is at least essentially impermeable to chemical or biological poisons.

14. The textile sheet material according to claim 1, wherein the textile sheet material has a stab-resistance of more than 20 Newtons according to DIN EN 388:2003 and wherein the textile sheet material has a cut-resistance of more than the factor 1.2 according to DIN EN 388:2003.

15. The textile sheet material according to claim 1, wherein the textile sheet material has a breaking strength of more than 25 Newtons according to DIN EN 388:2003 and wherein the textile sheet material has an abrasion resistance of more than 100 cycles according to DIN EN 388:2003.

16. A protective material comprising the textile sheet material according to claim 1.

17. The protective material according to claim 16, wherein the protective material is selected from the group consisting of protective suits, protective gloves, protective shoes and protective coverings.

18. A textile sheet material having stab resistance and ballistic resistance, and offering protective performance against chemical or biological poisons and warfare agents, wherein the textile sheet material has a multilayered construction, wherein the multilayered construction comprises:
- (a) at least one stab-resistant and ballistic-resistant layer, wherein the stab-resistant and ballistic-resistant layer is a textile fabric and has a basis weight of 0.5 kg/m$^2$ to 8 kg/m$^2$ and wherein the stab-resistant and ballistic-resistant layer comprises or consists of fibers or yarns based on a material selected from the group consisting of aramids and ultra high molecular weight polyethylenes (UHMWPE's), wherein the fibers or yarns have a fiber linear density of 50 to 5,000 denier; and
- (b) at least one adsorption layer based on discrete particles of adsorbent, wherein the adsorbent particles of the adsorption layer are based on activated carbon in the form of activated carbon particles, wherein the amount of activated carbon particles is 50 g/m$^2$ to 500 g/m$^2$;

wherein the adsorbent particles of the adsorption layer have a median diameter of at least 0.1 mm and less than 1.0 mm and wherein the adsorbent particles of the adsorption layer have a bursting pressure per individual adsorbent particle of at least 5 Newtons and up to 20 Newtons, wherein the textile sheet material has a stab-resistance of more than 10 Newtons according to DIN EN 388:2003, and a breaking strength of more than 10 Newtons according to DIN EN 388:2003;

wherein the adsorbent particles of the adsorption layer are secured to the stab-resistant and ballistic-resistant layer serving as a support for the adsorbent particles of the adsorption layer, or to a support layer arranged between the stab-resistant and ballistic resistant layer and the adsorption layer, the support layer serving as a support for the adsorbent particles of the adsorption layer.

* * * * *

UNITED STATES PATENT AND TRADEMARK OFFICE
CERTIFICATE OF CORRECTION

PATENT NO.         : 10,155,357 B2
APPLICATION NO.    : 13/202907
DATED              : December 18, 2018
INVENTOR(S)        : Bertram Böhringer It is certified that error appears in the above-identified patent and that said Letters Patent is hereby corrected as shown below:

In the Claims

Column 15, Line 40 please delete "8 kg/m'" and insert --8 kg/m$^2$--.

Signed and Sealed this
Twelfth Day of February, 2019

Andrei Iancu
*Director of the United States Patent and Trademark Office*